(12) United States Patent
Ohki et al.

(10) Patent No.: US 8,387,095 B2
(45) Date of Patent: Feb. 26, 2013

(54) BROADCAST RECEIVING APPARATUS CONNECTABLE TO EXTERNAL APPARATUS AND METHOD FOR CONTROLLING THE SAME

(75) Inventors: Takashi Ohki, Kawasaki (JP); Noriaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 396 days.

(21) Appl. No.: 12/748,716

(22) Filed: Mar. 29, 2010

(65) Prior Publication Data
US 2010/0251308 A1    Sep. 30, 2010

(30) Foreign Application Priority Data

Mar. 31, 2009  (JP) .................................. 2009-086157

(51) Int. Cl.
  *H04N 7/173*  (2011.01)
  *H04N 7/14*   (2006.01)
  *G08C 19/00*  (2006.01)
  *H04N 7/10*   (2006.01)
  *H04Q 1/00*   (2006.01)

(52) U.S. Cl. ............ 725/50; 725/54; 725/80; 340/12.29

(58) Field of Classification Search .................. 725/56, 725/50, 80, 81, 54; 340/12.29
See application file for complete search history.

(56) References Cited

U.S. PATENT DOCUMENTS

| | | | |
|---|---|---|---|
| 2007/0067802 A1* | 3/2007 | Carlson et al. | 725/47 |
| 2009/0007181 A1* | 1/2009 | Nakamura | 725/50 |
| 2010/0005502 A1* | 1/2010 | Onozawa | 725/133 |
| 2010/0251308 A1* | 9/2010 | Ohki et al. | 725/54 |
| 2011/0153803 A1* | 6/2011 | Kuo et al. | 709/224 |
| 2012/0124609 A1* | 5/2012 | Howcroft et al. | 725/24 |

FOREIGN PATENT DOCUMENTS

| | | |
|---|---|---|
| CN | 101335849 A | 12/2008 |
| JP | 2003-309734 A | 10/2003 |

* cited by examiner

Primary Examiner — Pankaj Kumar
Assistant Examiner — Reuben M Brown
(74) Attorney, Agent, or Firm — Canon U.S.A., Inc. IP Division

(57) ABSTRACT

A broadcast receiving apparatus includes a determination unit that determines whether an external apparatus is capable of transmitting broadcast program information about a plurality of channels via a communication unit. When the determination unit determines that the external apparatus is capable of transmitting the broadcast program information, an acquisition unit does not acquire the broadcast program information from the digital broadcast signal. The external apparatus is requested to transmit the broadcast program information. The broadcast program information is acquired from the external apparatus.

20 Claims, 7 Drawing Sheets

BROADCAST RECEIVING APPARATUS CONNECTABLE TO EXTERNAL APPARATUS AND METHOD FOR CONTROLLING THE SAME

BACKGROUND OF THE INVENTION

1. Field of the Invention

The present invention relates to a broadcast receiving apparatus and a method for controlling the same.

2. Description of the Related Art

A digital broadcast receiving apparatus generally has a function of displaying a program guide called an electronic program. guide (EPG). Broadcast program information including broadcast program names, broadcast times, and the like to generate such EPG is multiplexed as service information (SI) with a digital broadcast signal and is then transmitted.

In broadcasting satellite (BS) digital broadcasting, broadcast program information about all broadcast stations is collectively transmitted as all-station SI, and broadcast program information about each of the broadcast stations is individually transmitted as each-station SI. However, in digital terrestrial broadcasting, while the each-station SI is transmitted, the all-station SI is not transmitted. For this reason, for example, all broadcast station channels are sequentially tuned into during a standby state or the like, to acquire the broadcast program information about all broadcast stations. Thus, more time is consumed to acquire the broadcast program information about all broadcast stations, whereby power consumption is increased.

When a television receiving apparatus and a recording and reproducing apparatus are connected to each other, normally, each of the apparatuses receives a digital broadcast signal separately to acquire broadcast program information. If each of the apparatuses has a digital terrestrial broadcast program reception function, each apparatus separately acquires the same broadcast program information from a broadcast signal. From a viewpoint of energy conservation, such operation is to be eliminated.

Therefore, assuming that devices that can acquire the same broadcast program information are connected with each other, if only one of the devices can acquire broadcast program information from a digital broadcast signal and the other device can use the acquired broadcast program information, it is thought that power consumption used for acquiring the broadcast program information can be reduced.

Japanese Patent Application Laid-Open No. 2003-309734 discusses transmitting the broadcast program information received by an information terminal to other information terminals via electronic mail. However, while the above other information terminals can use the broadcast program information received via electronic mail, the method discussed in Japanese Patent Application Laid-Open No. 2003-309734 does not restrict the other information terminals to execute the operation of acquiring broadcast program information from a broadcast signal. Namely, since each of the two information terminals separately receives a broadcast signal and acquires the broadcast program information, the above operation of acquiring the same broadcast program information is still performed. Thus, power consumption consumed for acquiring the broadcast program information may not be reduced.

SUMMARY OF THE INVENTION

According to an aspect of the present invention, a broadcast receiving apparatus includes a reception unit configured to receive a digital broadcast signal, an acquisition unit configured to allow the reception unit to acquire broadcast program information about a plurality of channels from the digital broadcast signal, a communication unit configured to execute bidirectional communication with an external apparatus, a determination unit configured to determine whether the external apparatus is capable of transmitting the broadcast program information, and a control unit configured, when the determination unit determines that the external apparatus is capable of transmitting the broadcast program information, to prohibit the acquisition unit from acquiring the broadcast program information, to request the external apparatus to transmit the broadcast program information, and to acquire the broadcast program information from the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment of the present invention, two broadcast receiving apparatuses are connected to each other. One of the broadcast receiving apparatuses acquires broadcast program information from a digital broadcast signal, and the other broadcast receiving apparatus does not acquire the broadcast program information from a digital broadcast signal.

Figure 1:
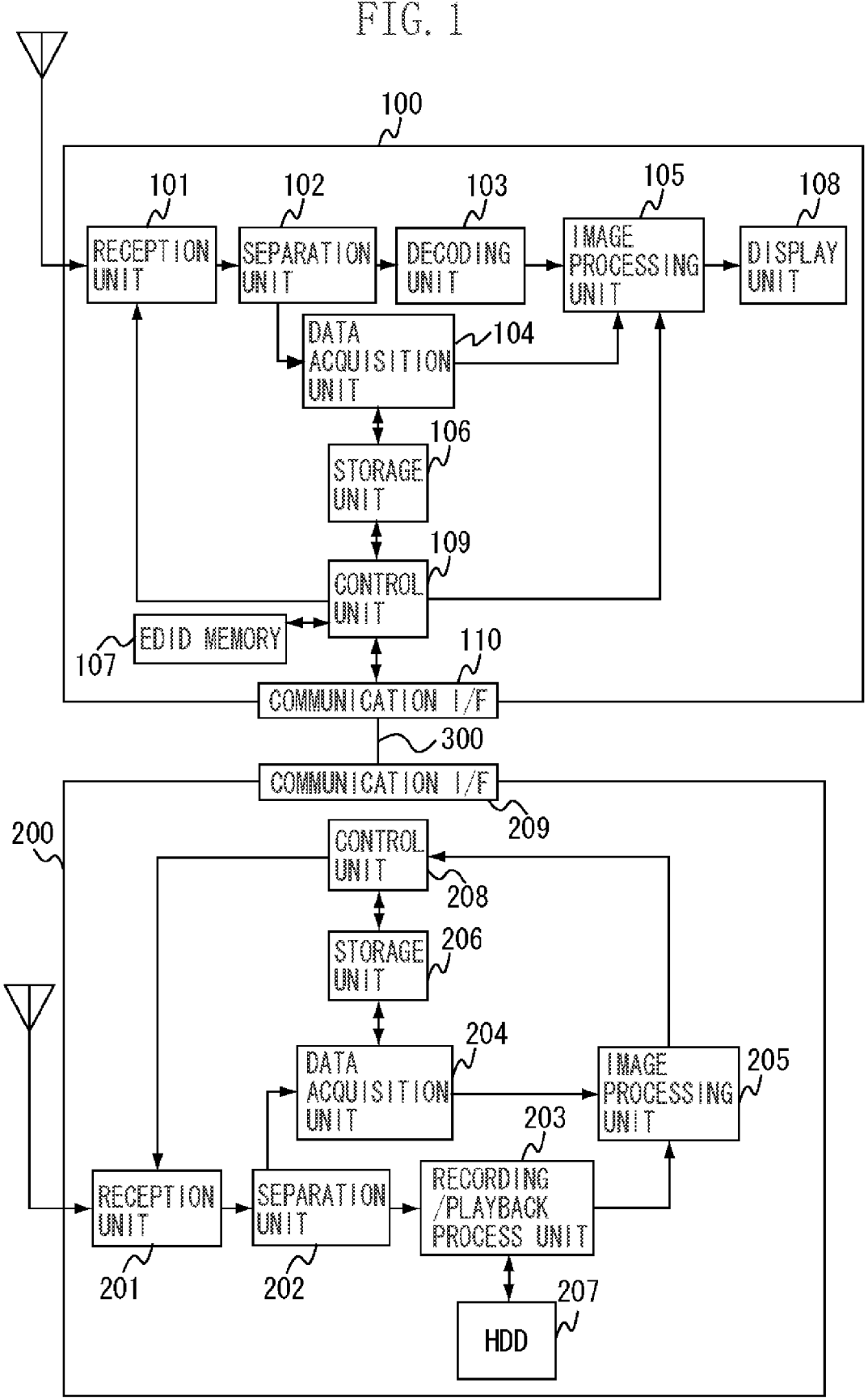
FIG. 1 is a block diagram illustrating a schematic configuration of a broadcast receiving system according to a first exemplary embodiment of the present invention.

FIG. 1 is a block diagram illustrating a schematic configuration of a broadcast receiving system according to the first exemplary embodiment of the present invention. The broadcast receiving system includes a broadcast receiving apparatus 100, which is a television receiving apparatus or the like, and a broadcast receiving apparatus 200, which is a hard disk recorder (recording and reproducing apparatus) or the like. Each of the broadcast receiving apparatuses 100 and 200 is a broadcast receiving apparatus connectable to an external apparatus, and the apparatuses 100 and 200 are connected to each other via a high-definition multimedia interface (HDMI) cable 300.

The broadcast receiving apparatus 100 includes a reception unit 101, a separation unit 102, a decoding unit 103, a data acquisition unit 104, an image processing unit 105, a storage unit 106, an extended display identification data (EDID) memory 107, a display unit 108, a control unit 109, and a communication interface (IF) 110. The broadcast receiving apparatus 200 includes a reception unit 201, a separation unit 202, a recording/playback process unit 203, a data acquisition unit 204, an image processing unit 205, a storage unit 206, a hard disk drive (HDD) 207, a control unit 208, and a communication IF 209.

The broadcast receiving apparatus 100 will be hereinafter described first. The reception unit 101 receives a digital terrestrial broadcasting signal via an antenna, tunes into signals of designated channels, executes demodulation/error correction processing and the like, and outputs signals of transport stream (TS) form. The separation unit 102 separates the TS signal supplied from the reception unit 101 into video, audio, and SI signals, for example. The decoding unit 103 decodes the video and audio signals supplied from the separation unit 102.

The data acquisition unit 104 receives the SI signal from the separation unit 102, acquires broadcast program information including broadcast program names, broadcast times, and broadcast program descriptions, and stores the information in the storage unit 106 (first storage unit). The control unit 109 controls the reception unit 101 to sequentially tune into and demodulate all channels at a preset time (regularly at predetermined intervals). In this way, the data acquisition unit 104 sequentially acquires the broadcast program information about all digital terrestrial broadcast channels and stores the information in the storage unit 106. When the reception unit 101 is not in operation, that is, during a standby or the like, the control unit 109 normally executes such control.

Based on instructions from a user, the image processing unit 105 executes processes, such as combining the video signal decoded by the decoding unit 103 and the broadcast program information acquired by the data acquisition unit 104, and causes the display unit 108 to display an image. For example, upon receiving instructions from a user to display an EPG, the image processing unit 105 reads the broadcast program information stored in the storage unit 106 via the data acquisition unit 104 and generates EPG display data.

The EDID memory 107 (second storage unit) stores image formats that can be displayed by the display unit 108 of the broadcast receiving apparatus 100, model information of the broadcast receiving apparatus 100, and the like. The EDID memory 107 also stores data, such as various types of address information assigned to devices connected to the communication IF 110. When the broadcast receiving apparatus 200 is connected to the communication IF 110 via the HDMI cable 300, the control unit 109 reads data stored in the EDID memory 107 and transmits the data to the broadcast receiving apparatus 200.

Next, the broadcast receiving apparatus 200 will be described. The reception unit 201 receives a digital terrestrial broadcasting signal via an antenna, tunes into signals of designated channels, executes demodulation/error correction processing and the like, and outputs signals of a TS form. The separation unit 202 separates the TS signal supplied from the reception unit 201 into video, audio, and SI signals, for example.

The recording/playback process unit 203 converts the signals such as the video, audio, and SI signals supplied from the separation unit 202 into a recording data format, executes encryption processing, and stores the signals in the HDD 207. Further, during reproduction, the recording/playback process unit 203 reads encrypted contents data stored in the HDD 207, executes decryption, executes a decoding process on the data, and outputs the data to the image processing unit 205. Additionally, the recording/playback process unit 203 can decode a digital broadcast signal being transmitted to the reception unit 201 and output the signal to the image processing unit 205.

The data acquisition unit 204 receives the SI signal from the separation unit 202, acquires the broadcast program information including broadcast program names, broadcast times, and broadcast program descriptions, and stores the information in the storage unit 206.

In a broadcast EPG reception mode, the control unit 208 controls the reception unit 201 to acquire the broadcast program information from a digital broadcast signal, and in an external EPG acquisition mode, the control unit 208 acquires the broadcast program information from an external apparatus instead of from a digital broadcast signal. More specifically, in the broadcast EPG reception mode, the reception unit 201 is controlled to sequentially tune into and demodulate all channels at a preset time (regularly at predetermined intervals). In this way, the data acquisition unit 204 sequentially acquires the broadcast program information about all digital terrestrial broadcast channels and stores the information in the storage unit 206. In contrast, in the external EPG acquisition mode, the broadcast program information about all digital terrestrial broadcast channels is acquired from the broadcast receiving apparatus 100 via the communication IF 209 and the information is stored in the storage unit 206 (details of this operation will be described below). According to the present exemplary embodiment, since the reception unit 201 is prohibited from sequentially tuning into and demodulating all digital terrestrial broadcast channels in the external EPG acquisition mode, power consumption used for acquiring the broadcast program information can be reduced. Setting of the broadcast EPG reception mode and the external EPG acquisition mode will be described in detail below.

Based on instructions from a user, the image processing unit 205 executes processes, such as combining the video signal decoded by the recording/playback process unit 203 and the broadcast program information acquired by the data acquisition unit 204, and outputs the video signal to the control unit 208. For example, upon receiving instructions from a user to display an EPG, the image processing unit 205 reads the broadcast program information stored in the storage unit 206 via the data acquisition unit 204 and generates EPG display data. The control unit 208 transmits the video signal supplied from the image processing unit 205 to the broadcast receiving apparatus 100 via the communication IF 209 and the HDMI cable 300. The video signal transmitted to the broadcast receiving apparatus 100 is supplied to the display unit 108 via the communication IF 110, the control unit 109, and the image processing unit 105.

In HDMI communication, a copyright protection technique referred to as high-bandwidth digital content protection (HDCP) is used to encrypt contents before being transmitted. In this way, inappropriate use of the contents is prevented. The control unit 208 encrypts the video signal supplied from the image processing unit 205 and transmits the signal to the control unit 109 via the communication IF 209, the HDMI cable 300, and the communication IF 110. The control unit 109 decrypts the video signal and outputs the signal to the image processing unit 105. Further, in HDMI communication, a transition minimized differential signaling (TMDS)

line is used to transmit video and audio signals. A display data channel (DDC) line is used to transmit information about sink-side device model names, statuses, and the like stored in the EDID memory 107. A consumer electronics control (CEC) line is used for control between devices. Each of the control units 109 and 208 can control an external apparatus through bidirectional communication of control signals/data via the CEC line.

Figure 2:
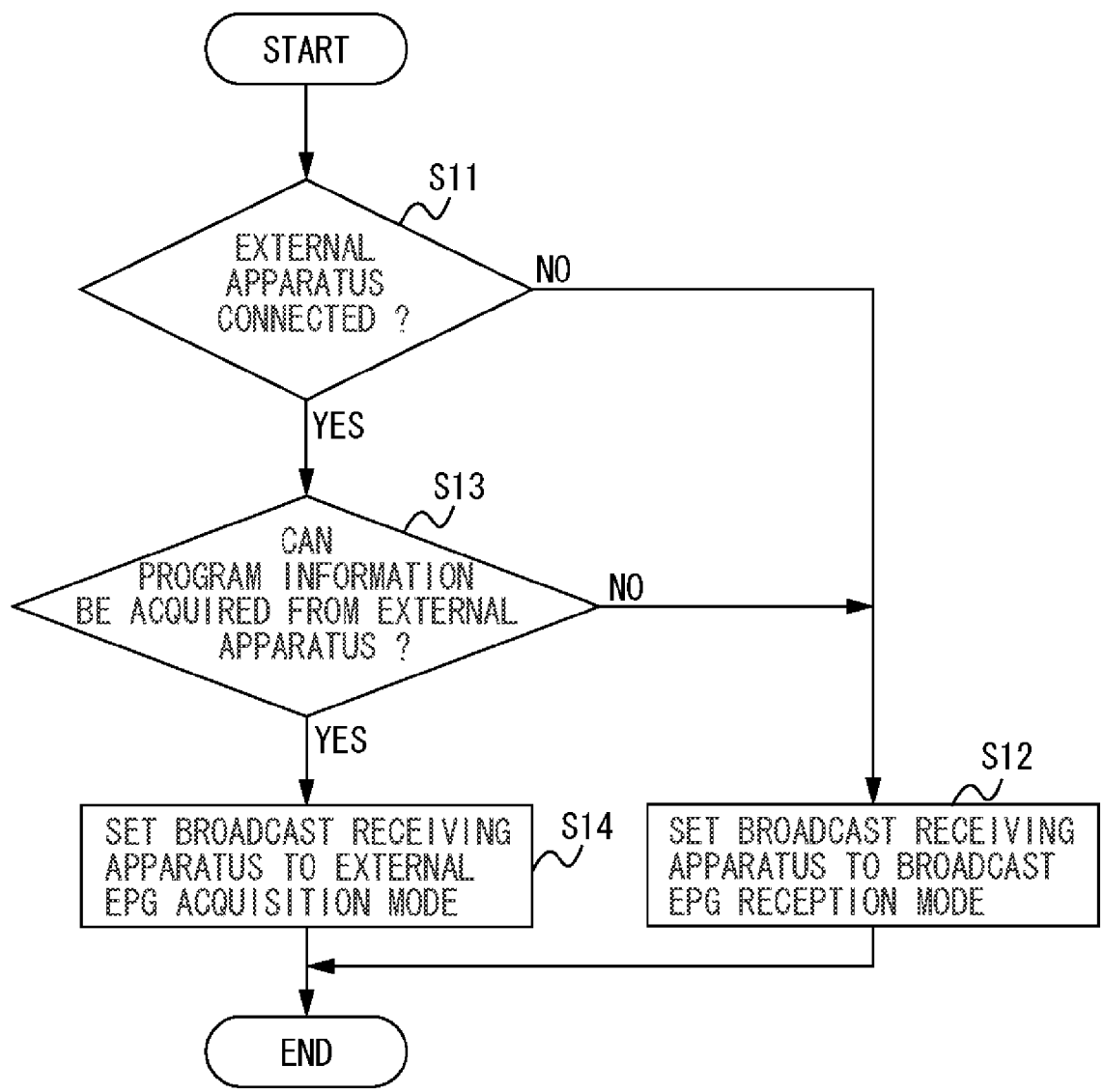
FIG. 2 is a flow chart illustrating a mode set operation executed by a control unit of a broadcast receiving apparatus illustrated in FIG. 1.

FIG. 2 is a flow chart illustrating a mode set operation executed by the control unit 208 of the broadcast receiving apparatus 200. First, in step S11, the control unit 208 determines whether the communication IF 209 is connected to an external apparatus. If no external apparatus is connected (NO in step S11), the operation proceeds to step S12, in which the broadcast receiving apparatus 200 is set to the broadcast EPG reception mode. In contrast, as illustrated in FIG. 1, if the control unit 208 detects that the communication IF 209 of the broadcast receiving apparatus 200 is connected to the broadcast receiving apparatus 100 via the HDMI cable 300 (YES in step S11), the operation proceeds to step S13.

In step S13, whether digital terrestrial broadcast program information can be acquired from the connected external apparatus is determined. More specifically, a list of information about models that are capable of transmitting the digital terrestrial broadcast program information to the outside through HDMI communication (compatible model information) is previously stored in the storage unit 206. When the control unit 208 detects that the broadcast receiving apparatus 100 has been connected to the communication IF 209 via the HDMI cable 300, the control unit 208 reads the model information (information about the model of the broadcast receiving apparatus 100) stored in the EDID memory 107. Next, by checking the information with the list of compatible model information previously stored in the storage unit 206, the control unit 208 determines whether the broadcast receiving apparatus 100 is capable of transmitting the digital terrestrial broadcast program information to the outside through HDMI communication.

Instead of previously storing a list of compatible model information in the storage unit 206, the following method maybe used to make the above determination. More specifically, the EDID memory 107 of the broadcast receiving apparatus 100 may be provided with an extended memory area in which information indicating that the broadcast receiving apparatus 100 is capable of transmitting the digital terrestrial broadcast program information to an external apparatus is written. In this way, by acquiring the information written in the extended memory area in the EDID memory 107 of the broadcast receiving apparatus 100, the control unit 208 can determine whether the broadcast receiving apparatus 100 is capable of transmitting the digital terrestrial broadcast program information to the outside through HDMI communication.

In step S13, if the control unit 208 determines that the digital terrestrial broadcast program information cannot be acquired from the connected external apparatus (NO in step S13), the operation goes to step S12, in which the control unit 208 sets the broadcast receiving apparatus 200 to the broadcast EPG reception mode. In contrast, if the control unit 208 determines that the digital terrestrial broadcast program information can be acquired from the connected external apparatus (YES in step S13), the operation proceeds to step S14, in which the control unit 208 sets the broadcast receiving apparatus 200 to the external EPG acquisition mode.

The above description has been made with reference to FIG. 2 based on an example where the control unit 208 of the broadcast receiving apparatus 200 automatically executes the above mode set operation. However, alternatively, a user may use a remote controller to set or change the mode.

Figure 3:
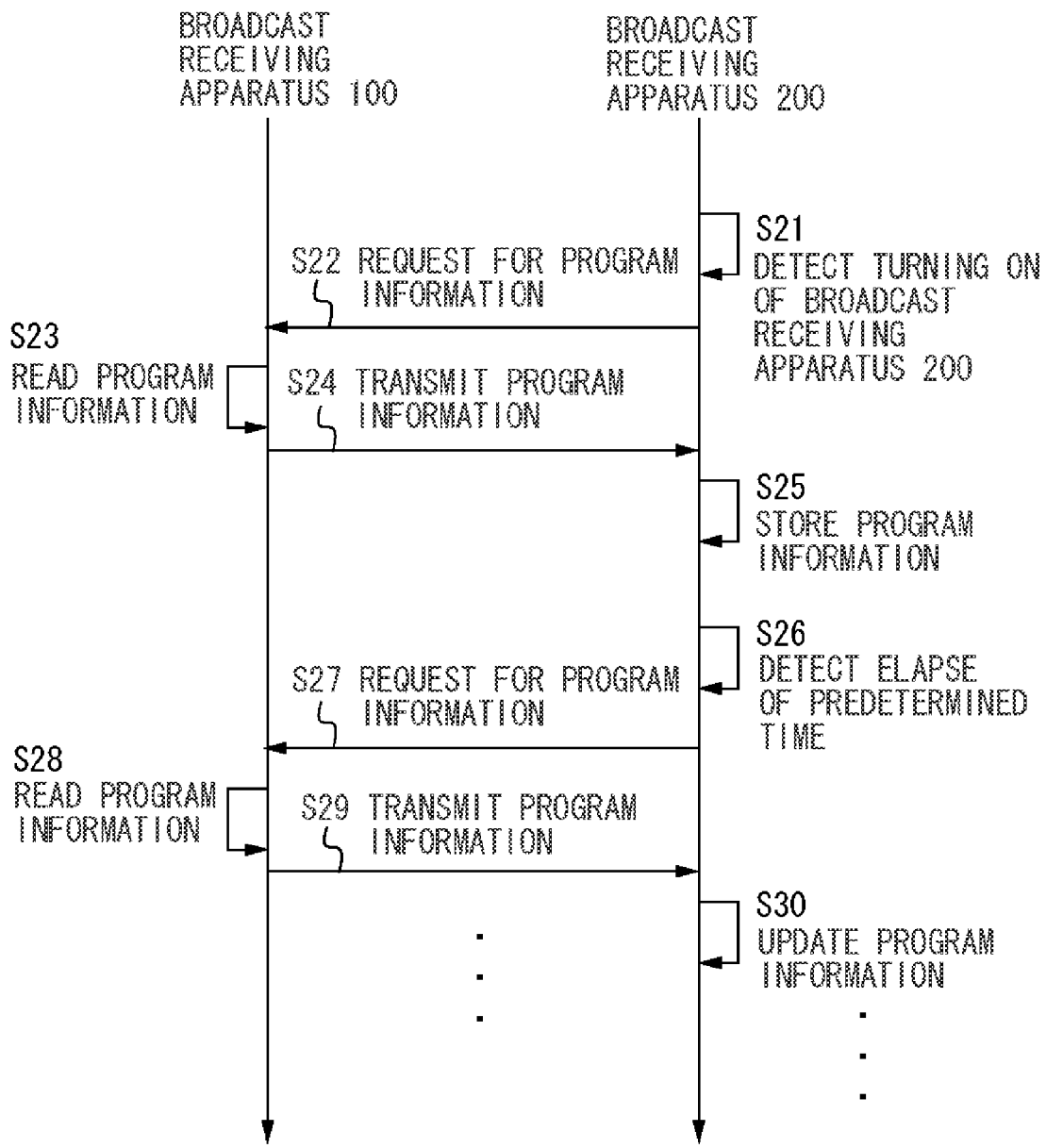
FIG. 3 is a sequence chart illustrating an operation in an external EPG acquisition mode.

FIG. 3 is a sequence chart illustrating an operation where the broadcast receiving apparatus 200 acquires the broadcast program information from the broadcast receiving apparatus 100 in the external EPG acquisition mode. In step S21, if the control unit 208 detects that the broadcast receiving apparatus 200 is turned on, the operation proceeds to step S22. In step S22, the broadcast receiving apparatus 200 requests the broadcast receiving apparatus 100 to transmit the digital terrestrial broadcast program information via the communication IF 209. Alternatively, the broadcast receiving apparatus 200 may be configured to request the broadcast receiving apparatus 100 to transmit the digital terrestrial broadcast program information at a preset time (regularly at predetermined intervals), instead of when the broadcast receiving apparatus 200 is turned on. Further alternatively, the broadcast receiving apparatus 200 may be configured to request the broadcast receiving apparatus 100 to transmit the digital terrestrial broadcast program information a predetermined time before recording of a broadcast program is started.

In step S23, upon receiving the request from the broadcast receiving apparatus 200 via the communication IF 110, the control unit 109 of the broadcast receiving apparatus 100 reads the broadcast program information about all digital terrestrial broadcast channels stored in the storage unit 106. Next, in step S24, the broadcast receiving apparatus 100 transmits the read broadcast program information to the broadcast receiving apparatus 200. Next, in step S25, the control unit 208 of the broadcast receiving apparatus 200 acquires the broadcast program information about all digital terrestrial broadcast channels transmitted from the broadcast receiving apparatus 100 via the communication IF 209 and stores the information in the storage unit 206.

An HDMI CEC line is used for transmission of the request command about the broadcast program information from the broadcast receiving apparatus 200 to the broadcast receiving apparatus 100 and for transmission of the broadcast program information from the broadcast receiving apparatus 100 to the broadcast receiving apparatus 200. However, other transmission lines such as an HDMI DDC line may be used for transmission of the broadcast program information from the broadcast receiving apparatus 100 to the broadcast receiving apparatus 200. Alternatively, a data area referred to as a "data island" of a blanking period of image data may be used for transmission. Additionally, communication units other than the HDMI may be used; for example, broadcast program information maybe transmitted through wireless communication.

Since it is desirable that the broadcast program information stored in the storage unit 206 be up-to-date, the broadcast program information is updated regularly. More specifically, in step S26, if the control unit 208 detects that a predetermined time has elapsed after the broadcast receiving apparatus 200 is turned on, the operation proceeds to step S27. In step S27, the broadcast receiving apparatus 200 requests the broadcast receiving apparatus 100 to transmit the digital terrestrial broadcast program information again.

In step S28, when the control unit 109 of the broadcast receiving apparatus 100 receives the request from the broadcast receiving apparatus 200 via the communication IF 110, the control unit 109 reads the up-to-date broadcast program information stored in the storage unit 106. Next, in step S29, the broadcast receiving apparatus 100 transmits the read broadcast program information to the broadcast receiving apparatus 200. Next, in step S30, the control unit 208 of the broadcast receiving apparatus 200 acquires the up-to-date digital terrestrial broadcast program information from the broadcast receiving apparatus 100 via the communication IF 209 and updates the broadcast program information stored in the storage unit 206. In this way, the broadcast program information stored in the storage unit 206 is updated regularly.

As described above, in the first exemplary embodiment, when the broadcast receiving apparatus 200 can acquire the digital terrestrial broadcast program information from an external apparatus connected thereto, the broadcast receiving apparatus 200 is set to the external EPG acquisition mode. In the external EPG acquisition mode, the control unit 208 of the broadcast receiving apparatus 200 is controlled to acquire the broadcast program information from an external apparatus, instead of from a digital broadcast signal. In the external EPG acquisition mode, since the reception unit 201 is prohibited from sequentially tuning into and demodulating all digital terrestrial broadcast channels, power consumption used for acquiring the broadcast program information can be reduced.

According to a variation of the first exemplary embodiment, to regularly update the broadcast program information stored in the storage unit 206, a version number of the broadcast program information is checked and whether any changes have been made to the broadcast program information is determined. Only when the version number of the broadcast program information is changed, the broadcast program information having the new version number is acquired from an external apparatus.

Figure 4:
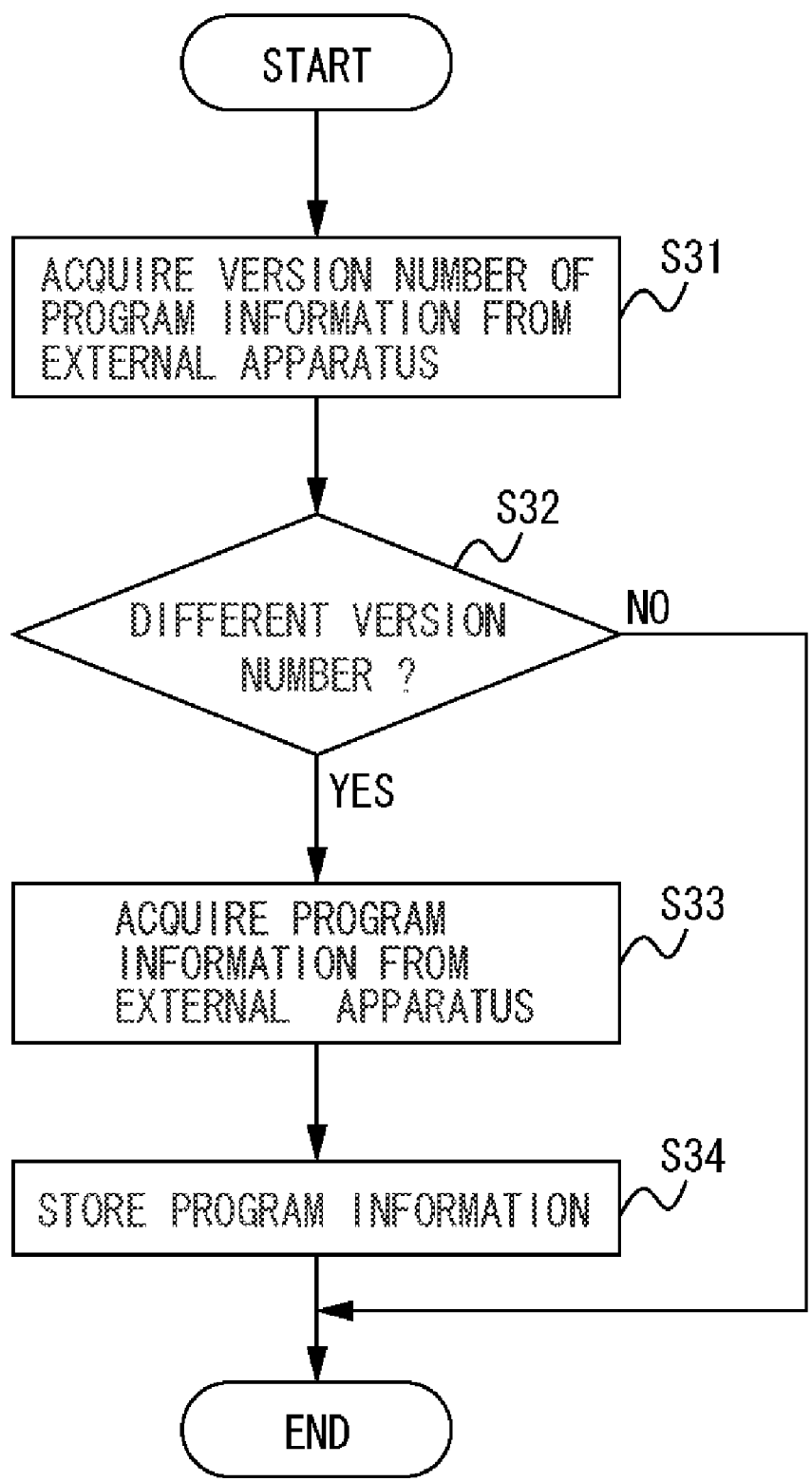
FIG. 4 is a flow chart illustrating a variation of the first exemplary embodiment of the present invention.

FIG. 4 is a flow chart illustrating the variation of the first exemplary embodiment of the present invention. According to the variation of the first exemplary embodiment, the broadcast program information is acquired from an external apparatus based on the flow chart of FIG. 4, instead of the sequence chart of FIG. 3.

In step S31, the control unit 208 of the broadcast receiving apparatus 200 regularly requests the broadcast receiving apparatus 100 to transmit a version number of the digital terrestrial broadcast program information stored in the storage unit 106 via the communication IF 209. Upon receiving the request from the broadcast receiving apparatus 200 via the communication IF 110, the control unit 109 of the broadcast receiving apparatus 100 reads the version number of the broadcast program information stored in the storage unit 106 and transmits the version number to the broadcast receiving apparatus 200. The control unit 208 acquires the transmitted version number from the broadcast receiving apparatus 100 via the communication IF 209. Since the digital terrestrial broadcast program information is provided with a version number and is then transmitted from a broadcast station, whether the broadcast program information is up-to-date can be determined by checking the version number thereof.

Next, in step S32, the control unit 208 compares the version number acquired from the broadcast receiving apparatus 100 with the version number of the broadcast program information stored in the storage unit 206. If the two version numbers compared are the same (NO in step S32), the control unit 208 determines that the broadcast program information in the storage unit 106 of the broadcast receiving apparatus 100 is not yet updated. Thus, the broadcast receiving apparatus 200 does not request the broadcast receiving apparatus 100 to transmit the broadcast program information, and the operation ends. However, if the two version numbers compared are different (YES in step S 32), the control unit 208 determines that the broadcast program information in the storage unit 106 of the broadcast receiving apparatus 100 is updated, and the operation proceeds to step S33.

In step S33, the control unit 208 requests the broadcast receiving apparatus 100 to transmit the broadcast program information having a new version number stored in the storage unit 106 via the communication IF 209. Upon receiving the request from the broadcast receiving apparatus 200 via the communication IF 110, the control unit 109 of the broadcast receiving apparatus 100 reads the broadcast program information having a new version number stored in the storage unit 106 and transmits the information to the broadcast receiving apparatus 200. The control unit 208 acquires the broadcast program information from the broadcast receiving apparatus 100 via the communication IF 209. Then, the control unit 208 stores the acquired new broadcast program information in the storage unit 206 and updates the broadcast program information in the storage unit 206.

An HDMI CEC line is used for transmission of the request command about the version number/broadcast program information from the broadcast receiving apparatus 200 to the broadcast receiving apparatus 100 and for transmission of the version number/broadcast program information from the broadcast receiving apparatus 100 to the broadcast receiving apparatus 200. However, other transmission lines such as an HDMI DDC line may be used for transmission of the version number/broadcast program information from the broadcast receiving apparatus 100 to the broadcast receiving apparatus 200. Alternatively, a data area referred to as a "data island" of a blanking period of image data may be used for transmission. Additionally, communication units other than the HDMI may be used; for example, broadcast program information may be transmitted through wireless communication.

As described above, according to this variation of the first exemplary embodiment, when the version number of the broadcast program information is changed, the broadcast program information having the new version number is acquired from an external apparatus. Thus, since the broadcast program information is acquired from an external apparatus only when the version number thereof is changed, an amount of information transmitted from an external apparatus can be reduced and the time consumed for the transmission can be shortened. As a result, power consumption can be further reduced.

According to the above first exemplary embodiment, the broadcast receiving apparatus 200 mainly controls the setting of the external EPG acquisition mode. However, according to a second exemplary embodiment of the present invention, the broadcast receiving apparatus 100 mainly controls and sets the broadcast receiving apparatus 200 to the external EPG acquisition mode. Since the configuration of the broadcast receiving system according to the second exemplary embodiment is similar to that illustrated in FIG. 1, detailed descriptions of the configuration of each of the broadcast receiving apparatuses 100 and 200 are not repeated herein.

Figure 5:
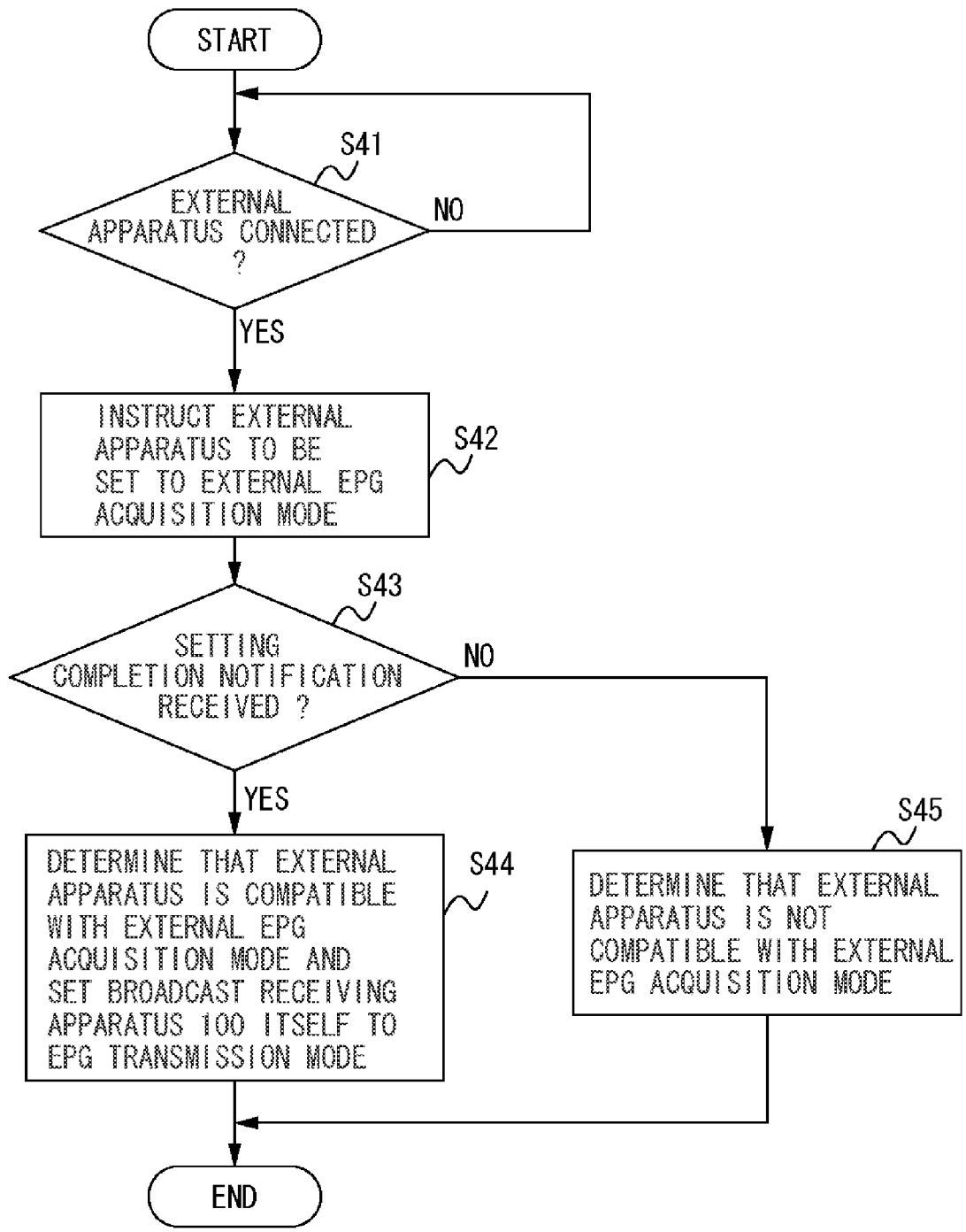
FIG. 5 is a flow chart illustrating a mode set operation according to a second exemplary embodiment of the present invention.

FIG. 5 is a flowchart illustrating an operation where the broadcast receiving apparatus 100 mainly controls and sets the broadcast receiving apparatus 200 to the external EPG acquisition mode. According to the second exemplary embodiment, the control unit 208 of the broadcast receiving apparatus 200 does not execute the mode set operation illustrated in FIG. 2. Instead, the control unit 109 of the broadcast receiving apparatus 100 executes the mode set operation illustrated in FIG. 5.

First, in step S41, the control unit 109 determines whether the communication IF 110 is connected to an external apparatus. If the control unit 109 detects that the communication IF 209 of the broadcast receiving apparatus 100 is connected to the broadcast receiving apparatus 200 via the HDMI cable 300 as illustrated in FIG. 1 (YES in step S41), the operation proceeds to step S42.

In step S42, the control unit 109 transmits a control command to set the external apparatus (broadcast receiving apparatus 200) to the external EPG acquisition mode via the communication IF 110. Upon receiving the control command about the setting of the external EPG acquisition mode via the communication IF 110, the control unit 208 sets the broadcast receiving apparatus 200 to the external EPG acquisition mode. Next, when set in the external EPG acquisition mode, the broadcast receiving apparatus 200 transmits a setting completion notification to the broadcast receiving apparatus 100 via the communication IF 209. In the external EPG acquisition mode, the control unit 208 of the broadcast receiving apparatus 200 acquires the broadcast program information from an external apparatus (broadcast receiving apparatus 100), instead of from a digital broadcast signal. Namely, the control unit 208 prohibits the reception unit 201 from sequentially tuning into and demodulating all digital terrestrial broadcast channels.

In step S43, the control unit 109 of the broadcast receiving apparatus 100 determines whether a setting completion notification has been transmitted thereto via the communication IF 110. If the control unit 109 receives the setting completion notification (YES in step S43), the operation proceeds to step S44, in which the broadcast receiving apparatus 100 determines that the external apparatus (broadcast receiving apparatus 200) is a model compatible with the external EPG acquisition mode. Next, the control unit 109 sets the broadcast receiving apparatus 100 to an EPG transmission mode and sets the broadcast receiving apparatus 200 as a destination of the broadcast program information. On the other hand, if the control unit 109 does not receive the setting completion notification (NO in step S43), the operation proceeds to step S45, in which the control unit 109 determines that the external apparatus is not a model compatible with the external EPG acquisition mode, and the operation then ends.

An HDMI CEC line is used for transmission of the control command about the setting of the external EPG acquisition mode from the broadcast receiving apparatus 100 to the broadcast receiving apparatus 200 and for transmission of the setting completion notification from the broadcast receiving apparatus 200 to the broadcast receiving apparatus 100. However, other HDMI transmission lines and communication units other than the HDMI may be used. For example, wireless communication may be used to transfer the broadcast program information.

Figure 6:
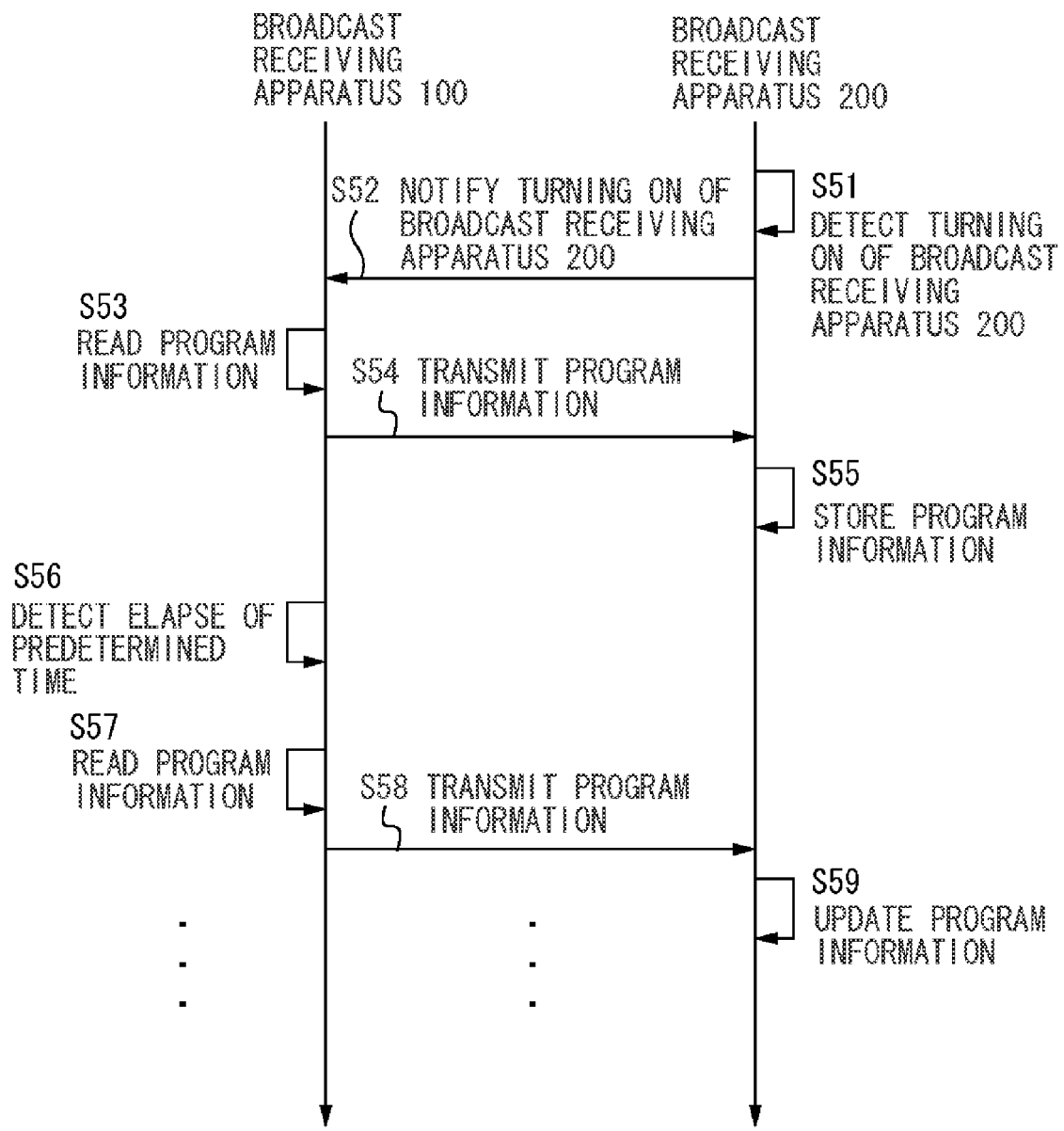
FIG. 6 is a sequence chart illustrating an operation in an EPG transmission mode.

FIG. 6 is a sequence chart illustrating the operation where the broadcast receiving apparatus 100 transmits the broadcast program information to the broadcast receiving apparatus 200 in the EPG transmission mode. In step S51, the control unit 208 of the broadcast receiving apparatus 200 detects that the broadcast receiving apparatus 200 is turned on, the operation proceeds to step S52. In step S52, the broadcast receiving apparatus 100 is notified of turning on of the broadcast receiving apparatus 200 via the communication IF 209.

In step S53, when notified of turning on of the broadcast receiving apparatus 200 via the communication IF 110, the control unit 109 of the broadcast receiving apparatus 100 reads the broadcast program information about all digital terrestrial broadcast channels stored in the storage unit 106. Next, in step S54, the broadcast receiving apparatus 100 transmits the read broadcast program information to the broadcast receiving apparatus 200. Alternatively, the broadcast receiving apparatus 100 may transmit the digital terrestrial broadcast program information to the broadcast receiving apparatus 200 at a preset time (regularly at predetermined intervals), instead of when notified of turning on of the broadcast receiving apparatus 200.

Next, in step S55, the control unit 208 of the broadcast receiving apparatus 200 acquires the transmitted broadcast program information about all digital terrestrial broadcast channels from the broadcast receiving apparatus 100 via the communication IF 209 and stores the information in the storage unit 206.

An HDMI CEC line is used for transmission of the notification of turning on of the broadcast receiving apparatus 200 from the broadcast receiving apparatus 200 to the broadcast receiving apparatus 100 and for transmission of the broadcast program information from the broadcast receiving apparatus 100 to the broadcast receiving apparatus 200. Alternatively, other transmission lines such as an HDMI DDC line may be used for transmission of the broadcast program information from the broadcast receiving apparatus 100 to the broadcast receiving apparatus 200. Alternatively, communication units other than the HDMI may be used. For example, wireless communication may be used to transfer the broadcast program information.

Since it is desirable that the broadcast program information stored in the storage unit 206 be up-to-date, the broadcast program information is updated regularly. More specifically, in step S56, if the control unit 109 detects that a predetermined time has elapsed after the broadcast receiving apparatus 200 is turned on, the operation proceeds to step S57. In step S57, the control unit 109 of the broadcast receiving apparatus 100 reads the up-to-date broadcast program information stored in the storage unit 106. Next, in step S58, the broadcast receiving apparatus 100 transmits the read broadcast program information to the broadcast receiving apparatus 200. In step S59, the control unit 208 of the broadcast receiving apparatus 200 acquires the up-to-date digital terrestrial broadcast program information from the broadcast receiving apparatus 100 via the communication IF 209 and updates the broadcast program information stored in the storage unit 206. In this way, the broadcast program information stored in the storage unit 206 is regularly updated.

Thus, according to the second exemplary embodiment, the control unit 109 sets the connected external apparatus (broadcast receiving apparatus 200) to the external EPG acquisition mode and sets the broadcast receiving apparatus 100 to the EPG transmission mode. In the external EPG acquisition mode, the control unit 208 of the broadcast receiving apparatus 200 acquires the broadcast program information from an external apparatus, instead of from a digital broadcast signal. Thus, as in the first exemplary embodiment, in the external EPG acquisition mode, since the reception unit 201 is prohibited from sequentially tuning into and demodulating all digital terrestrial broadcast channels, power consumption used for acquiring the broadcast program information can be reduced.

When a single broadcast receiving apparatus 100 is connected to a plurality of broadcast receiving apparatuses, the broadcast receiving apparatus 100 controls the plurality of broadcast receiving apparatuses connected thereto in a similar way as described above. In this case, power consumption used for acquiring the broadcast program information can be reduced by the number of the plurality of broadcast receiving apparatuses.

According to a variation of the second exemplary embodiment, by checking the version number of the broadcast program information stored in the storage unit 106, whether the information is updated is determined. Only when the version number of the broadcast program information is changed, the broadcast program information having the new version number is transmitted to an external apparatus.

Figure 7:
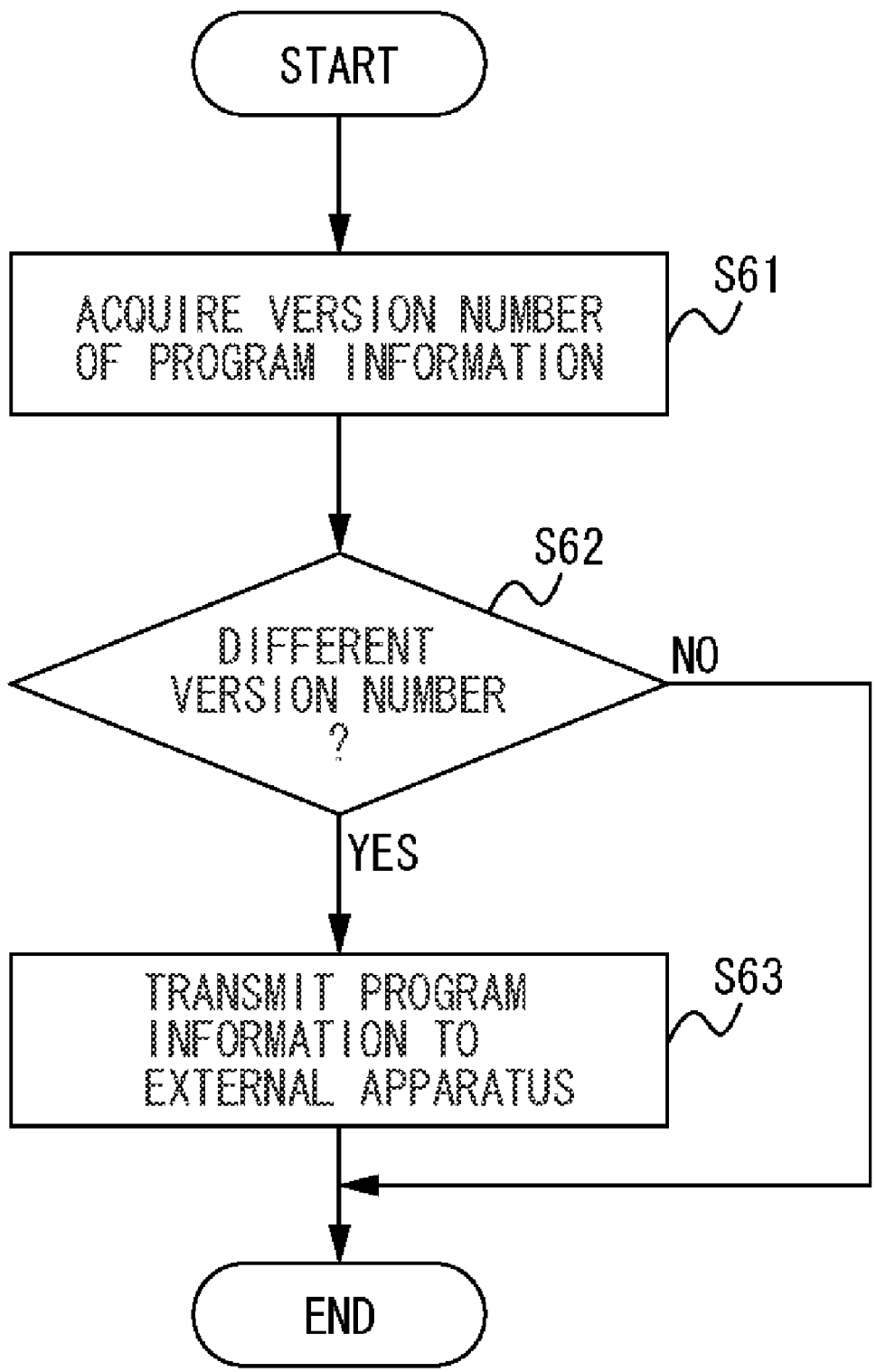
FIG. 7 is a flow chart illustrating a variation of the second exemplary embodiment of the present invention.

FIG. 7 is a flow chart illustrating the variation of the second exemplary embodiment. According to the variation of the second exemplary embodiment, the broadcast program information is transmitted to the external apparatus based on the flow chart of FIG. 7, instead of the sequence chart of FIG. 6.

In step S61, the control unit 109 of the broadcast receiving apparatus 100 regularly reads and checks the version number of the digital terrestrial broadcast program information stored in the storage unit 106. Each time the control unit 109 checks the version number, the control unit 109 retains the acquired version number.

Next, in step S62, the control unit 109 compares the version number acquired at the last check and the version number acquired at the current check. If the two version numbers compared are the same (NO in step S62), the control unit 109 determines that the broadcast program information stored in the storage unit 106 is not yet updated. Thus, the control unit 109 does not transmit the broadcast program information to the external apparatus (broadcast receiving apparatus 200), and the operation then ends. If the two version numbers compared are different (YES in step S62), the control unit 109 determines that the broadcast program information stored in the storage unit 106 is updated, and the operation then proceeds to step S63.

In step S63, the control unit 109 reads the broadcast program information having a new version number stored in the storage unit 106 and transmits the information to the broadcast receiving apparatus 200 via the communication IF 110. The control unit 208 of the broadcast receiving apparatus 200 acquires the broadcast program information from the broadcast receiving apparatus 100 via the communication IF 209, stores the acquired new broadcast program information in the storage unit 206, and updates the broadcast program information in the storage unit 206.

As described above, according to the variation of the second exemplary embodiment, when the version number of the broadcast program information is changed, the broadcast program information having the new version number is transmitted to an external apparatus. Thus, only when the version number of the broadcast program information is changed, the broadcast program information having the new version number is transmitted to an external apparatus. Therefore, an amount of information transmitted to an external apparatus can be reduced and the time consumed for the transmission can be shortened. As a result, power consumption can be further reduced.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-086157 filed Mar. 31, 2009, which is hereby incorporated by reference herein in its entirety.

What is claimed is:

1. A broadcast receiving apparatus comprising:
   a reception unit configured to receive a digital broadcast signal;
   an acquisition unit configured to acquire broadcast program information about a plurality of channels from the digital broadcast signal;
   a communication unit configured to execute bidirectional communication with an external apparatus;
   a determination unit configured to determine whether the external apparatus is capable of transmitting the broadcast program information; and
   a control unit configured to set the broadcast receiving apparatus in a first acquisition mode when the determination unit determines that the external apparatus is capable of transmitting the broadcast program information, and to set the broadcast receiving apparatus in a second acquisition mode when the determination unit determines that the external apparatus is not capable of transmitting the broadcast program information,
   wherein, in the first acquisition mode, the acquisition unit does not acquire the broadcast program information from the digital broadcast signal even if the acquisition unit is capable of acquiring the broadcast program information from the digital broadcast signal, the control unit requests the external apparatus to transmit the broadcast program information, and acquires the broadcast program information from the external apparatus, and
   wherein, in the second acquisition mode, the acquisition unit acquires the broadcast program information from the digital broadcast signal.

2. The broadcast receiving apparatus according to claim 1, wherein the acquisition unit can acquire the broadcast program information by allowing the reception unit to sequentially tune into the plurality of channels.

3. The broadcast receiving apparatus according to claim 1, further comprising a storage unit configured to store information about a list of compatible models that are capable of transmitting the broadcast program information,
   wherein the determination unit acquires information about a model of the external apparatus and compares the information with the stored information about the list of compatible models, to determine whether the external apparatus is capable of transmitting the broadcast program information.

4. The broadcast receiving apparatus according to claim 1, wherein, in the first acquisition mode, the control unit requests the external apparatus to transmit the broadcast program information when the broadcast receiving apparatus is turned on, when a preset time is reached, or when a predetermined time before a recording start time is reached.

5. The broadcast receiving apparatus according to claim 1, wherein, in the first acquisition mode, the control unit acquires a version number of the broadcast program information from the external apparatus, and wherein if the control unit determines that the version number is changed, the control unit requests the external apparatus to transmit the broadcast program information.

6. A broadcast receiving apparatus comprising:
   a reception unit configured to receive a digital broadcast signal;
   an acquisition unit configured to acquire broadcast program information about a plurality of channels from the digital broadcast signal;

a storage unit configured to store the acquired broadcast program information;

a communication unit configured to execute bidirectional communication with an external apparatus;

a determination unit configured to determine whether the external apparatus is capable of acquiring the broadcast program information from the broadcast receiving apparatus; and a control unit configured, when the determination unit determines that the external apparatus is capable of acquiring the broadcast program information, to set the external apparatus in a first acquisition mode in which the external apparatus does not acquire the broadcast program information from the digital broadcast signal even if the external apparatus is capable of acquiring the broadcast program information from the digital broadcast signal, and to transmit the stored broadcast program information to the external apparatus.

7. The broadcast receiving apparatus according to claim 6, wherein the acquisition unit can acquire the broadcast program information by allowing the reception unit to sequentially tune into the plurality of channels.

8. The broadcast receiving apparatus according to claim 6, wherein the control unit acquires a version number of the broadcast program information, and when the control unit determines that the version number is changed, the control unit transmits the stored broadcast program information to the external apparatus.

9. A method for controlling a broadcast receiving apparatus comprising:

receiving a digital broadcast signal;

acquiring broadcast program information about a plurality of channels from the received digital broadcast signal by an acquisition unit;

executing bidirectional communication with an external apparatus;

determining whether the connected external apparatus is capable of transmitting the broadcast program information;

setting the broadcast receiving apparatus in a first acquisition mode by a control unit, when it is determined that the external apparatus is capable of transmitting the broadcast program information; and setting the broadcast receiving apparatus in a second acquisition mode when the determining determines that the external apparatus is not capable of transmitting the broadcast program information, wherein, in the first acquisition mode, the acquisition unit does not acquire the broadcast program information from the digital broadcast signal even if the acquisition unit is capable of acquiring the broadcast program information from the digital broadcast signal, the control unit requests the external apparatus to transmit the broadcast program information, and acquires the broadcast program information from the external apparatus, and wherein, in the second acquisition mode, the acquisition unit acquires the broadcast program information from the digital broadcast signal.

10. The method according to claim 9, wherein the acquiring the broadcast program information comprises allowing sequentially tuning into the plurality of channels.

11. The method according to claim 9, further comprising:

storing information about a list of compatible models that are capable of transmitting the broadcast program information;

acquiring information about a model of the external apparatus and comparing the information with the stored information about the list of compatible models to determine whether the external apparatus is capable of transmitting the broadcast program information.

12. The method according to claim 9, further comprising requesting the external apparatus to transmit the broadcast program information when the broadcast receiving apparatus is turned on, when a preset time is reached, or when a predetermined time before a recording start time is reached.

13. The method according to claim 9, further comprising acquiring a version number of the broadcast program information from the external apparatus, and wherein if it is determined that the version number is changed, requesting the external apparatus to transmit the broadcast program information.

14. A method for controlling a broadcast receiving apparatus comprising:

receiving a digital broadcast signal;

acquiring broadcast program information about a plurality of channels from the received digital broadcast signal by an acquisition unit;

storing the acquired broadcast program information;

executing bidirectional communication with an external apparatus;

determining whether the external apparatus is capable of acquiring the broadcast program information from the broadcast receiving apparatus; and setting the external apparatus in a first acquisition mode by a control unit, when it is determined that the external apparatus is capable of acquiring the broadcast program information, in which the external apparatus does not acquire the broadcast program information from the digital broadcast signal even if the external apparatus is capable of acquiring the broadcast program information from the digital broadcast signal, and transmitting the stored broadcast program information to the external apparatus.

15. The method according to claim 14, wherein the acquiring the broadcast program information comprises allowing sequentially tuning into the plurality of channels.

16. A non-transitory computer readable storage medium storing a computer-executable program of instructions for causing a computer to perform a method comprising:

receiving a digital broadcast signal;

acquiring broadcast program information about a plurality of channels from the received digital broadcast signal by an acquisition unit;

executing bidirectional communication with an external apparatus;

determining whether the connected external apparatus is capable of transmitting the broadcast program information;

setting the broadcast receiving apparatus in a first acquisition mode by a control unit, when it is determined that the external apparatus is capable of transmitting the broadcast program information; and setting the broadcast receiving apparatus in a second acquisition mode when the determining determines that the external apparatus is not capable of transmitting the broadcast program information, wherein, in the first acquisition mode, the acquiring does not acquire the broadcast program information from the digital broadcast signal even if the acquisition unit is capable of acquiring the broadcast program information from the digital broadcast signal, the control unit requests the external apparatus to transmit the broadcast program information, and acquires the broadcast program information from the external apparatus, and wherein, in the second acquisition mode, the acquisition unit acquires the broadcast program information from the digital broadcast signal.

17. The non-transitory computer readable storage medium according to claim 16, wherein the acquiring the broadcast program information comprises allowing sequentially tuning into the plurality of channels.

18. The non-transitory computer readable storage medium according to claim 16, further comprising:

storing information about a list of compatible models that are capable of transmitting the broadcast program information;

acquiring information about a model of the external apparatus and comparing the information with the stored information about the list of compatible models to determine whether the external apparatus is capable of transmitting the broadcast program information.

19. The non-transitory computer readable storage medium according to claim 16, further comprising requesting the external apparatus to transmit the broadcast program information when an apparatus which is controlled by the method is turned on, when a preset time is reached, or when a predetermined time before a recording start time is reached.

20. The non-transitory computer readable storage medium according to claim 16, further comprising acquiring a version number of the broadcast program information from the external apparatus, and wherein if it is determined that the version number is changed, requesting the external apparatus to transmit the broadcast program information.

* * * * *